US008839208B2

(12) United States Patent
Schmelter et al.

(10) Patent No.: US 8,839,208 B2
(45) Date of Patent: Sep. 16, 2014

(54) RATING INTERESTINGNESS OF PROFILING DATA SUBSETS

(75) Inventors: Ralf Schmelter, Wiesloch (DE); Dietrich Mostowoj, Ludwigshafen (DE); Johannes Scheerer, Heidelberg (DE); Steffen Schreiber, Frankenthal (DE); Michael Wintergerst, Muehlhausen (DE)

(73) Assignee: SAP AG, Walldorf (DE)

( * ) Notice: Subject to any disclaimer, the term of this patent is extended or adjusted under 35 U.S.C. 154(b) by 693 days.

(21) Appl. No.: 12/969,653

(22) Filed: Dec. 16, 2010

(65) Prior Publication Data

US 2012/0159455 A1 Jun. 21, 2012

(51) Int. Cl.
*G06F 9/44* (2006.01)
*G06F 11/34* (2006.01)

(52) U.S. Cl.
CPC ...... *G06F 11/3409* (2013.01); *G06F 2201/865* (2013.01); *G06F 11/3452* (2013.01); *G06F 11/3466* (2013.01)
USPC .......... 717/130

(58) Field of Classification Search
USPC .......... 717/130
See application file for complete search history.

(56) References Cited

U.S. PATENT DOCUMENTS

| | | | | |
|---|---|---|---|---|
| 6,658,652 | B1 * | 12/2003 | Alexander et al. | 717/128 |
| 7,725,771 | B2 | 5/2010 | Wintergerst et al. | |
| 7,904,493 | B2 | 3/2011 | Schmelter et al. | |
| 2008/0040373 | A1 | 2/2008 | Knehmichel et al. | |
| 2008/0082908 | A1 | 4/2008 | MacGregor | |
| 2008/0208895 | A1 | 8/2008 | Rowley | |
| 2008/0228550 | A1 | 9/2008 | Tan et al. | |
| 2008/0229285 | A1 | 9/2008 | Housser | |
| 2009/0198647 | A1 | 8/2009 | Tong | |
| 2009/0282045 | A1 | 11/2009 | Hsieh et al. | |
| 2009/0320003 | A1 * | 12/2009 | Barsness et al. | 717/146 |
| 2011/0138363 | A1 | 6/2011 | Schmelter et al. | |
| 2011/0138365 | A1 | 6/2011 | Schmelter et al. | |
| 2011/0138366 | A1 | 6/2011 | Wintergerst et al. | |
| 2011/0138385 | A1 | 6/2011 | Schmelter et al. | |

* cited by examiner

*Primary Examiner* — Li B Zhen
*Assistant Examiner* — Sen Chen

(57) ABSTRACT

Systems and methods for rating interestingness of profiling data subsets are described. Profiling data including a set of nodes associated with at least one executed computer program is received. The profiling data contains a first set of scores corresponding to the resource consumption of the nodes. A second set of scores is identified from the profiling data, wherein a score of the second set of scores indicates a combined resource consumption of a corresponding node of the set of nodes and at least one other node of the set of nodes related to the corresponding node. An interestingness rate is evaluated for groups of nodes of the set of nodes based on the corresponding scores. The group of nodes with the highest, or satisfactory high value of the calculated interestingness rate is presented.

17 Claims, 7 Drawing Sheets

| Method | Self Objects | Total Objects |
|---|---|---|
| com.sapportals.config.fwk.util.ConfigurationCache.run()void ▲ | 1 | 6 |
| java.util.HashMap.<init>(Map)void ▲ | 0 | 3 |
| java.util.HashMap.<init>(int,float)void ▲ | 1 | 1 |
| java.util.HashMap.putAllForCreate(Map)void ▲ | 0 | 2 |
| java.util.HashMap$EntrySet.iterator()java.util.Iterator ▲ | 0 | 1 |
| java.util.HashMap.newEntryIterator()java.util.Iterator ▲ | 1 | 1 |
| java.util.HashMap.putForCreate(Object, Object)void ▲ | 0 | 1 |
| java.util.HashMap.createEntry(int, Object, Object, int)void ▲ | 1 | 1 |
| java.util.HashMap$KeySet.iterator()java.util.Iterator ▲ | 0 | 1 |
| java.util.HashMap.newKeyIterator()java.util.Iterator ▲ | 1 | 1 |
| java.util.HashMap.keySet()java.util.Set ▲ | 1 | 1 |

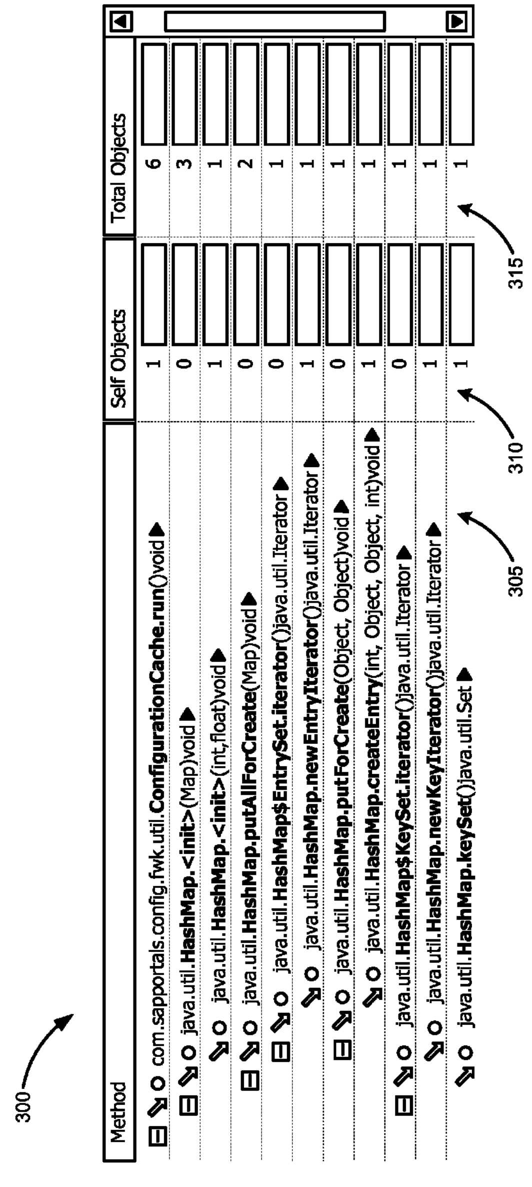

FIG. 3

| Method | Self Objects | Total Objects |
|---|---|---|
| ○ java.lang.**AbstractStringBuilder.expandCapacity**(int)void | 30,972 | 30,972 |
| ♂F java.lang.**String.<init>**(char[], int, int)void | 102,904 | 102,904 |
| ○F java.lang.**AbstractStringBuilder.<init>**(int)void | 71,359 | 71,359 |
| ♂F java.lang.**String.substring**(int, int)java.lang.String | 170,531 | 170,531 |
| ○ java.util.**HashMap.<init>**()void | 40,721 | 40,767 |
| No java.lang.**Object.clone**()java.lang.Object | 105,416 | 105,416 |
| ○ com.sap.engine.services.deploy.**ApplicationInformation.getDependants**(DeploymentInfo | 67,974 | 272,054 |
| ○ java.util.**HashMap.addEntry**(int, Object, Object, int)void | 94,079 | 96,110 |
| ○ java.util.**AbstractList.IteratorI()**java.util.Iterator | 91,220 | 91,220 |
| ♂F java.util.**StringBuilder.toString**()java.lang.String | 70,169 | 140,338 |
| ○ java.util.**ArrayList.<init>**(int)void | 31,077 | 31,077 |
| ○ com.sap.engine.services.deploy.**ReferenceObject.<init>**()void | 67,816 | 67,816 |

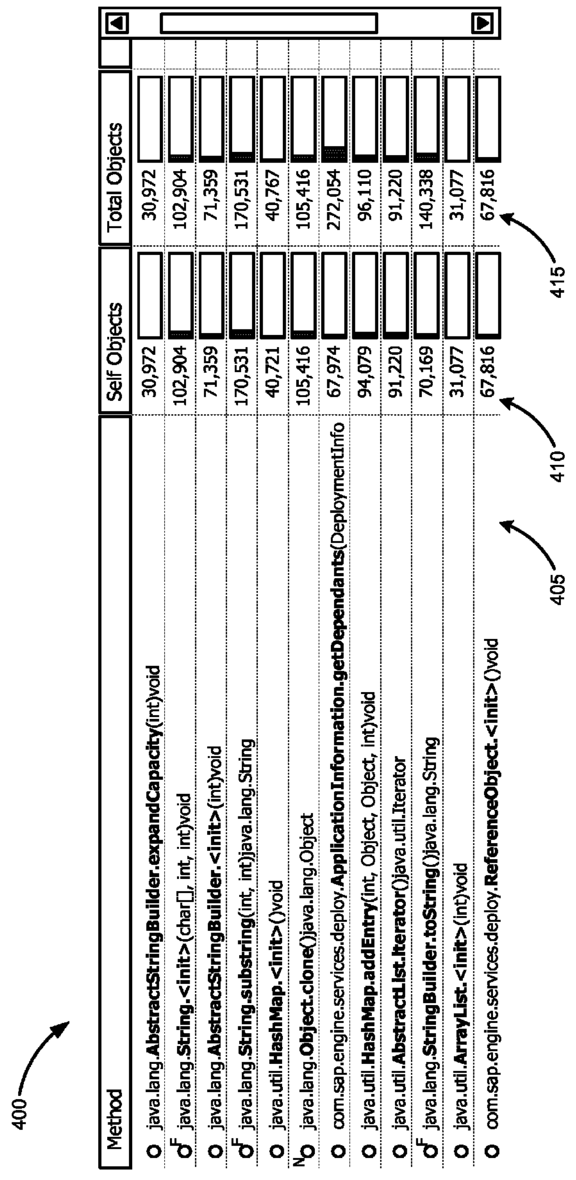

FIG. 4

RATING INTERESTINGNESS OF PROFILING DATA SUBSETS

BACKGROUND

Software profiling is a technique for measuring resource consumption in computer systems by different software structures. A software profiling mechanism implemented in a computer system environment can collect and analyze data about various resources consumed by different software applications running in the computer system environment. For example, the various resources may include central processing unit (CPU) usage, memory allocations, input/output (IO) operations, number of method calls, etc. The software profiling mechanism, or the profiler, may collect resource consumption data for different parts of the running software applications, e.g., per software objects instantiated in the computer system environment, per separate methods or functions, etc. The profiling data can be used for different purposes, and is especially helpful for identifying inefficient programming structures.

A profiling mechanism may collect data and generate statistics about a quantity of a certain type of resource consumed by different parts of software applications. For example, a profiler may collect data and generate statistics about memory allocations for each method invoked within an application server runtime environment. In case of a relatively complex application server runtime environment, where profiling mechanisms are usually implemented, the number of invoked methods during a single profiler run may easily exceed several thousands. With such a big number, it is hard to identify inefficient methods, characterized with excessive resource consumption. Simple sorting of the methods, or of other investigated programming structures, based on their individual levels of resource consumption could be misleading, as the programming structures are often interrelated. The resource consumption of one programming structure could be a function from the resource consumption of another programming structure.

SUMMARY

Various embodiments of systems and methods for rating interestingness of profiling data subsets are described herein. In one aspect, profiling data including a set of nodes associated with at least one executed computer program is received. Together with the set of nodes, a first set of scores is received, where a score of the first set of scores indicates a resource consumption of a corresponding node of the set of nodes. A second set of scores is identified from the profiling data, wherein a score of the second set of scores indicates a combined resource consumption of a corresponding node of the set of nodes and at least one other node of the set of nodes related to the corresponding node. In another aspect, a group of nodes is selected from the set of nodes based on the scores from one or more of the first set of scores and the second set of scores corresponding to the selected nodes. In yet another aspect, an interestingness rate is evaluated for the group of nodes of the set of nodes based on the corresponding scores. The group of nodes is presented when the value of the calculated interestingness rate is satisfactory.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 3 illustrates a user interface screen containing profiling statistics, according to one embodiment.

FIG. 4 illustrates a user interface screen containing profiling statistics, according to one embodiment.

DETAILED DESCRIPTION

Embodiments of techniques for rating interestingness of profiling data subsets are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
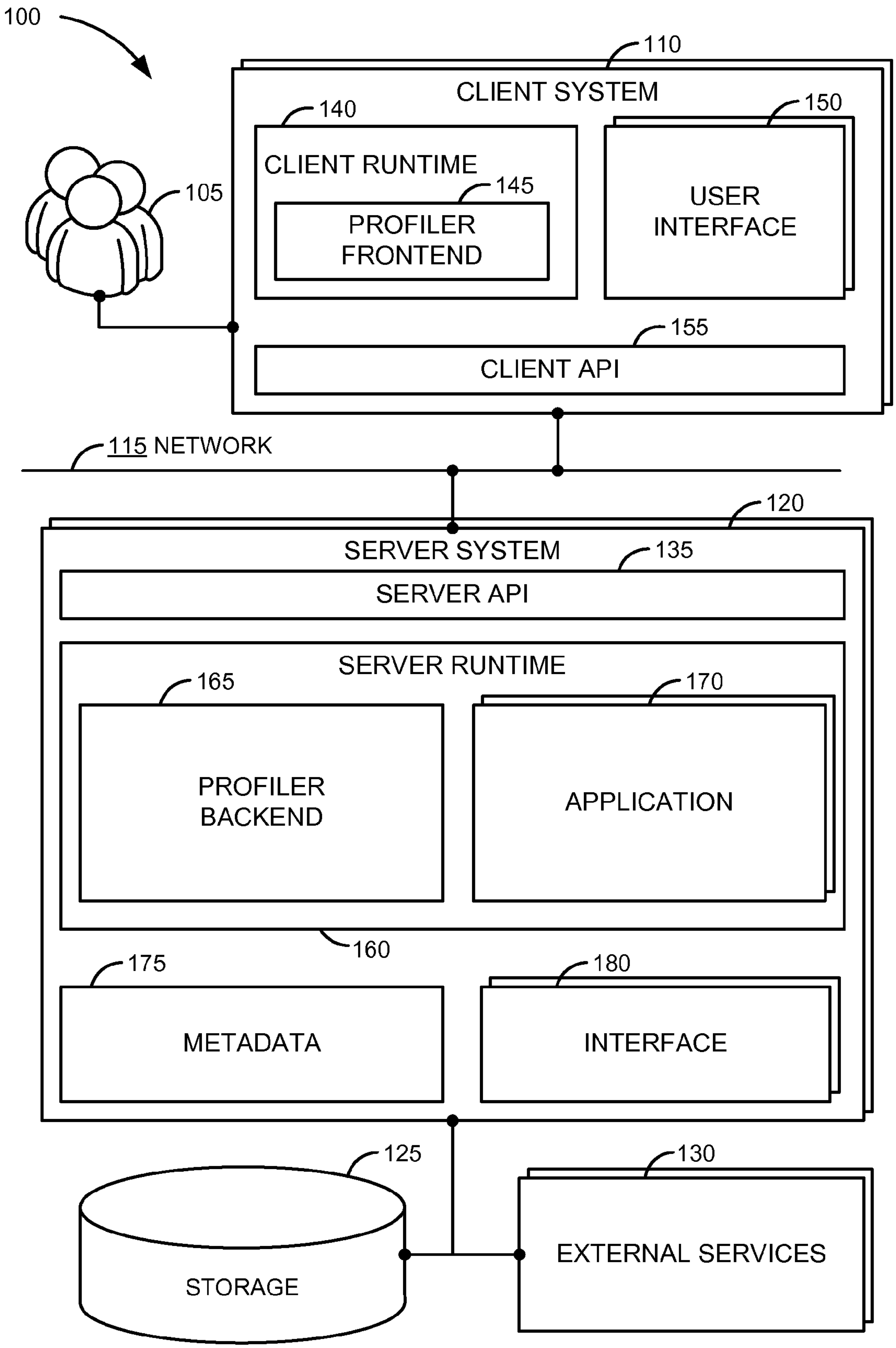
FIG. 1 is a block diagram illustrating a system where profiling mechanism is implemented, according to one embodiment.

FIG. 1 shows simplified computer system 100 where profiling mechanism is implemented, according to one embodiment. The computer system 100 can include at least one client system 110 communicating with server system 120 via network 115. Users 105 access client system 110 to configure and operate with various services provided by one or more software applications deployed in the server system 120. The server system 120 may be built to run one or more application server instances on one or more physical hardware server systems. The server system 120 may be configured as a cluster when more than one application server instances or/and physical hardware servers are included.

The client system 110 may represent a variety of processing devices, e.g., desktop computers, laptops, cellular phones, handheld devices (for example, personal digital assistant (PDA)), navigation devices, etc. Each of the users 105 may access one or more sessions of user interface (UI) 150 to operate with the available software services. Client runtime 140 provides an environment where client side software applications are deployed and executed. In one embodiment, different client side software applications may be installed on the client system 110 to provide functionality necessary for accessing the services provided by the server system 120. For example, some client side software applications may pre-process service requests initiated through UI 150. Other client side software applications can be used in designing new, or in changing existing software services at the server systems 120.

The client system 110 establishes interface with server system 120 using appropriate functions, methods and data formatting as defined by client application programming interface (API) 155. In one embodiment, the different elements of the client system 110, e.g., UI 150, client runtime 140 and client API 155, are implemented within a common framework. For example, an Internet browser could provide such a common framework. The additional functionality required for the described is plug ins, or other extensions, e.g., Silverlight™ development platform provided by Microsoft Corporation. Other examples for such frameworks may include Java™ Virtual Machine (JVM) originally specified by Sun Microsystems, Inc.; .Net™ Framework specified by Microsoft Corporation, etc.

The modules of server system 120 correspond to some of the basic elements included in general application server architectures. Server runtime 160 establishes an environment where one or more software applications 170 are deployed and executed. The access to the services provided by applications 170 is managed through server API 135. In one embodiment, metadata component 175 represents data structures where the application server stores descriptions of programming or business objects, and/or different parameters relevant to the deployed applications 170. The metadata 175 could be accessed by the server runtime 160 during the deployment and the execution of the applications 170. In one embodiment, the server system 120 is built using Java™ based application server platform, e.g., compliant with Java Enterprise Edition (Java EE™) specification. The elements of the server system 120 could be executed within a server side JVM.

Interfaces 180 provide the server system 120 with access to external resources. External services 130 represent an example for such external resources. The external services 130 may be provided from other computer systems connected to the server system 120 directly, via network 115, or via other networks. The external services 130 may include business services provided by legacy systems, infrastructure services, messaging or notification services, etc. Storage 125 is another example for external resource. The storage 125 could be a database, where any of the software and hardware elements of the server system 120, including the physical servers and the application server instances, may extract and store data. The data that is placed in the storage 125 could be shared among the different units of the server system 120.

In one embodiment, the software profiling mechanism implemented in the computer system 100 includes profiler frontend 145 and profiler backend 165 parts. The main function of the profiling mechanism is to collect, analyze and present data for the runtime of various computer programs, including system programs, applications 170, etc. The profiler backend 165 could be deployed and executed in the server runtime environment 160. In one embodiment, the profiler backend may be integrated with the server runtime 160, e.g., developed as an integral part or enhancement of the JVM. The profiler backend 165 is capable of tracing and capturing data about the process threads of the software programs executed in the server runtime 160, e.g., applications 170.

For example, the profiler backend 165 may collect data about function calls, parameter values, variables, memory consumption, execution times, instantiated objects, etc. The granularity of the collected data could be broken down to individual methods or program instructions. The profiler backend 165 could store the selected profiling data locally at the server system 120. Alternatively, the profiler backend 165 may transfer the collected data to storage 125, where data from all units of the server system 120 could be collected and aggregated. In one embodiment, the profiling data is directly communicated to the client system 110 through server API 135.

The setup and execution management of the profiler backend 165 could be administered through profiler frontend 145. The responsible users 105 who are authenticated with respective privileges at client system 110 may access the profiler frontend 145 through a session of the UI 150. The profiler frontend 145 may include various controls for setup and management of the execution of the profiling mechanism implemented in the system 100. Further, the profiler frontend 145 may include functionality for processing, analyzing and presenting the data collected by the profiler backend 165. The responsible users 105 may configure the type of analysis of the profiling data to be performed, the way the profiling data is to be presented, etc.

The data extracted by the profiler mechanism, e.g., the profiling data, generally relates to actions or events occurring in the server runtime 160. The examples for such actions may include the start of process threads, allocation of objects, method enter events, method exit events, method parameters, thread stack traces, etc. In one embodiment, the profiling data includes identifications of a set of runtime structure entities associated with the running computer programs. The profiling data also includes measures or scores for quantities of resources consumed by the runtime structure entities with respect to one or more of the actions occurring in the server runtime 160.

Figure 2A:
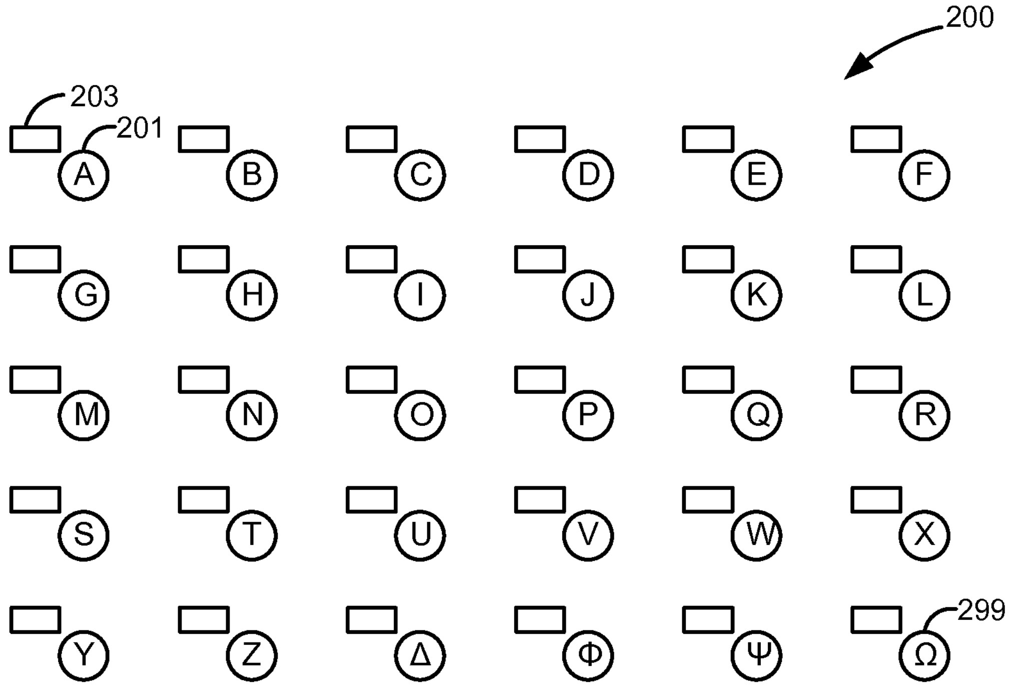
FIG. 2A illustrates a set of runtime structure entities associated with one or more profiled computer programs, according to one embodiment.

FIG. 2A shows set 200 of runtime structure entities associated with one or more executed computer programs, e.g., running applications. The runtime structure entities are illustrated with circles. Each runtime structure entity is a separate node of the set 200, e.g., nodes "A" 201 to "Ω" 299. For example, the nodes of set 200 could correspond to different methods of one or more running applications. In FIG. 2A, a label representing a corresponding score or level of consumption of a particular resource is adjacent to every runtime structure entity from the set 200. Node "A" 201 is coupled with score 203. Similarly, the rest of the nodes in the set 200 are coupled with their corresponding score, as illustrated. For example, the scores may provide information for the size of the operative memory allocated to each node, e.g., method, of the set 200.

Figure 2B:
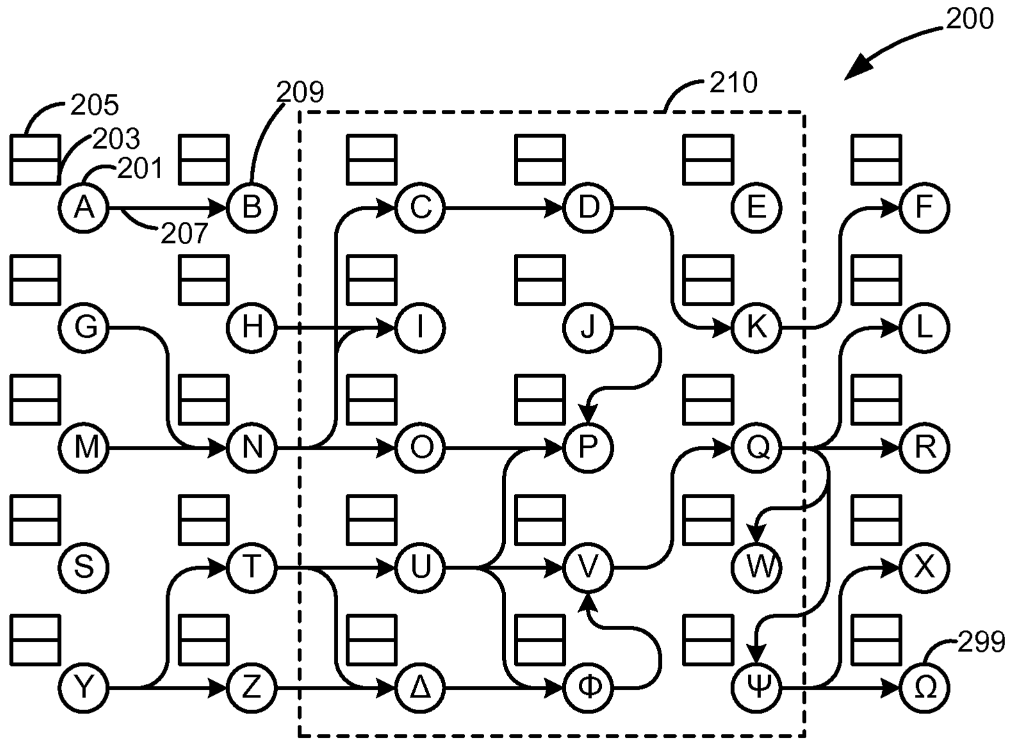
FIG. 2B illustrates a set of related runtime structure entities associated with one or more profiled computer programs, according to one embodiment.

Usually, there are relationships between the different structure entities in a runtime environment. FIG. 2B shows the set 200 of runtime structure entities (nodes "A" 201 to "Ω" 299) with a number of relationships between the entities. The relationships are illustrated with the help of directed graph edges connecting related nodes. The relationships correspond to dependencies between the structure entities established in the runtime environment. For example, when the nodes of set 200 correspond to methods executed in the runtime environment, the relationship between two nodes shows that the method represented by one of the nodes calls the method represented by the other node. Thus, edge 207 represents a relationship between node "A" 201 and node "B" 209, according to which the method represented by node "A" 201 calls the method represented by node "B" 209.

The relationships between the nodes, e.g., the runtime structure entities, associated with the profiled computer programs executed in a computer system define hierarchical structure. Some of the nodes in the hierarchical structure are senior, e.g., they are parent nodes, some are child nodes, and some of the nodes are both parents and children. The direction of an edge connecting nodes illustrates the parent-child relationship. Node "A" 201 is parent to node "B" 209, and node "B" 209 is child to node "A" 201. A parent method calls or invokes the execution of one or more child methods, e.g., the execution of a child method is invoked by a parent method. In one embodiment, relationships may exist between entities of different executed programs. In one embodiment, the relationships between the runtime structure entities of the profiled computer programs may define a tree structure.

The resource consumption of the runtime structure entities, e.g., nodes, may be further profiled by including data for "total" consumed quantity when relationships between the entities are defined. The "total" quantity for a given node includes the quantity consumed by the node and the quantity consumed by any other node from the profiled set of nodes related to the given node. In one embodiment, only the resource quantities consumed by the child nodes are added to the "total" quantity of the given node. Label 205 in FIG. 2B contains the "total" resource quantity consumed by node "A" 201 and the related node "B" 209, while label 203 holds the "self" quantity of the resource, e.g., the consumption attributed to the node "A" 201 itself.

In one embodiment, a user may not be interested in the profiling data for all nodes in the set 200 of the runtime structure entities. A subset 210 of the nodes could be selected based on certain criteria. Only the nodes in subset 210 and their respective resource consumption scores could be analyzed and presented to the responsible parties.

In one embodiment, an execution of a profiling mechanism implemented in a computer system may generate statistics about a certain type of resource consumed within the structure entities of the profiled programs by a certain type of program entities. For example, the profiling mechanism could generate statistics about resources consumed by the methods executed within one or more of the running applications or one or more of the running system programs in the computer system. One such resource could be the memory allocations between a number of methods in a Java application program, where a generated statistics could contain the size of the operational memory allocated for each method called within the program.

FIG. 3 shows UI screen 300 containing an exemplary part of generated statistics represented by a tree-like hierarchy of methods, e.g., entities associated with a profiled program. The UI screen 300 in FIG. 3 is divided in three areas. The first area 305 enlists methods executed within one or more profiled Java™ computer programs. The hierarchy between the enlisted methods is illustrated with the help of symbols and indentions, where the child methods are listed under their corresponding parent methods. Alternative approaches for displaying methods or other nodes associated with the profiled programs, and the hierarchy between the nodes, could be used as well. The hierarchy is defined by the call sequence of the enlisted methods. In one embodiment, one and the same method may be listed more than once in area 305 when it is part of different calling sequences, e.g., different branches of the tree. Identical calling sequences may be aggregated.

Area 310 shows a list of the quantities of memory allocated or consumed by the corresponding methods displayed in the area 305. The quantities in the area 310 represent the resource consumption directly attributed to the nodes in area 305, e.g., the "self" quantity values or scores. Area 315 shows the "total" values of the quantities consumed by the methods enlisted in area 305. Each of the "total" values in area 315 includes the quantities consumed by the children of the corresponding node, if any.

Usually, a profiling run may contain thousands of nodes (methods or other entities associated with the profiled programs). Therefore, different approaches may apply to get an overview of where the profiled resource quantity is consumed the most, e.g., at which nodes. One of the approaches is to convert the tree into a flat statistic, e.g., not presenting the existing hierarchy between the nodes, sorted by the "self" scores. This would show in which methods the measured resource is mostly consumed. FIG. 4 shows UI screen 400 with areas 405, 410 and 415 displaying a flat list of methods with highest values for memory allocation quantities. However, with this approach, generic methods, e.g., for string and collection handling, usually end up at the top of the sorted list of methods, since these methods are the building blocks of the Java™ programs.

Figure 5:
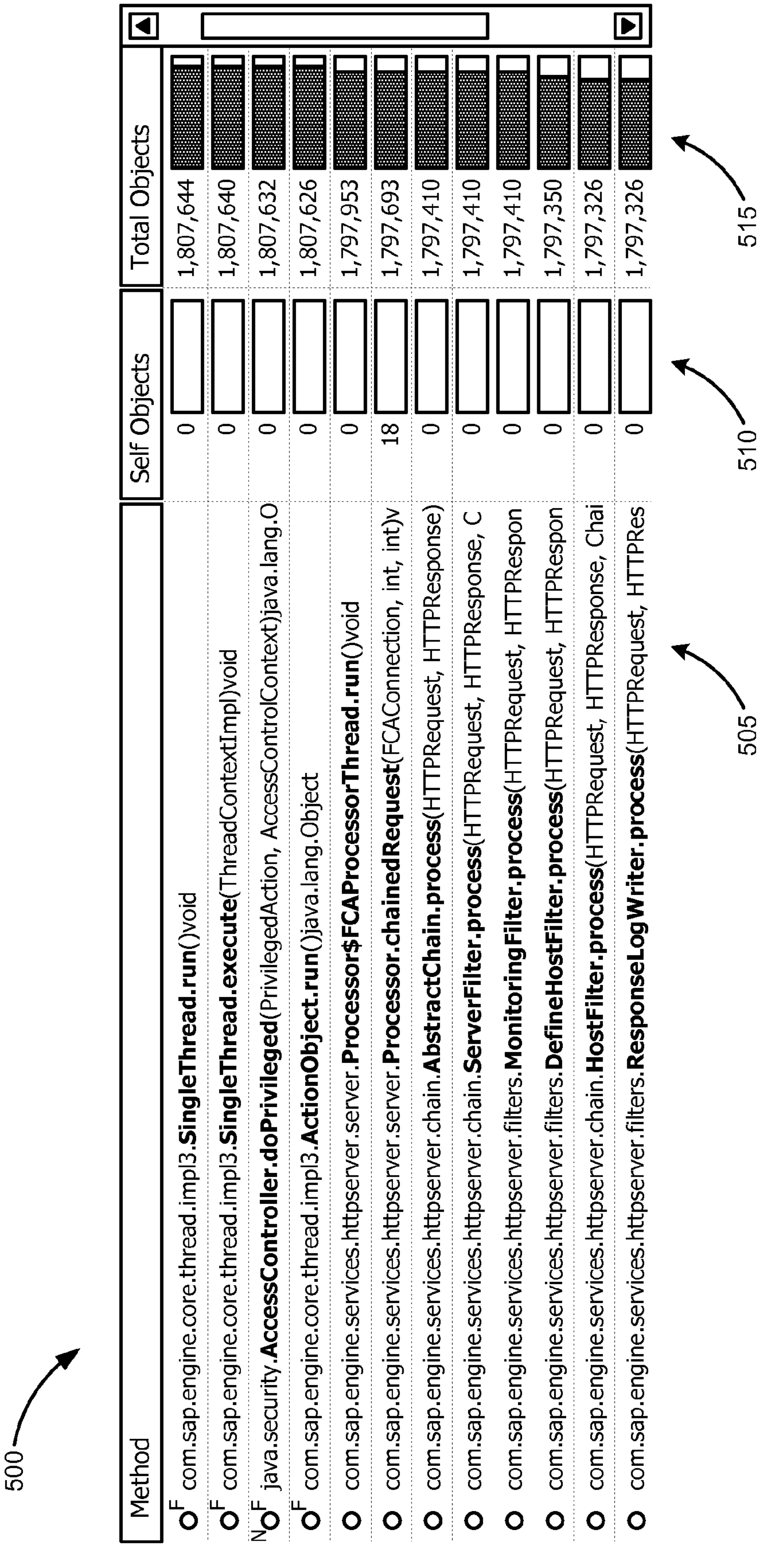
FIG. 5 illustrates a user interface screen containing profiling statistics, according to one embodiment.

Another approach is to sort a list of the methods executed within the profiled programs by the "total" scores. FIG. 5 illustrates UI screen 500 with areas 505, 510 and 515 showing statistics for the profiled data sorting the nodes by the "total" scores. The most interesting methods from the perspective of the program developers and administrators should be those methods at the top of the list in area 505, as they have the highest "total" scores as shown in area 515. However, what UI screen 500 shows is the list of the most delegating methods, e.g., the methods which most often start threads from where most of the other methods are called.

An advantageous approach of presenting profiling statistics for computer programs is based on evaluating interestingness of subsets of nodes, e.g., subsets of profiled runtime structure entities. According to this approach, a subset of "N" nodes best representing the whole set of profiled entities has to be identified. This approach requires definition of criteria for selecting the appropriate subset of the nodes from the profiling data. One of the elements of this criteria specifies that the "total" value for resource consumption assigned to a node should be relatively large to exclude insignificant methods from the set of "N" most representative nodes. Another element of the criteria defines that a node should not be dominated by a related node. For example, if a parent method "A" simply forwards the work to a child method "B", it is better to select method "B" as more specific and interesting from resource consumption perspective.

In addition to the criteria for individual selection of interesting nodes to represent the profiling data, the nodes in the subset should comply with group criteria as well. The whole subset of "N" nodes should be selected to cover most of the measured quantity, e.g., the consumed resources. In the example of the memory allocation trace, a group criteria element specifies that the subset of "N" selected methods or the methods related to the "N" selected methods should consume most of the allocated memory. The overlap between the selected nodes in the subset should be avoided, e.g., the number of related nodes in the subset should be at minimum. Another group criteria element for selecting the nodes in the representative subset requires selecting nodes with similar corrected scores. A corrected score for a method is the "total" resource consumption quantity when the method does not directly or indirectly call another method of the representative subset where the quantity is consumed.

Figure 6:
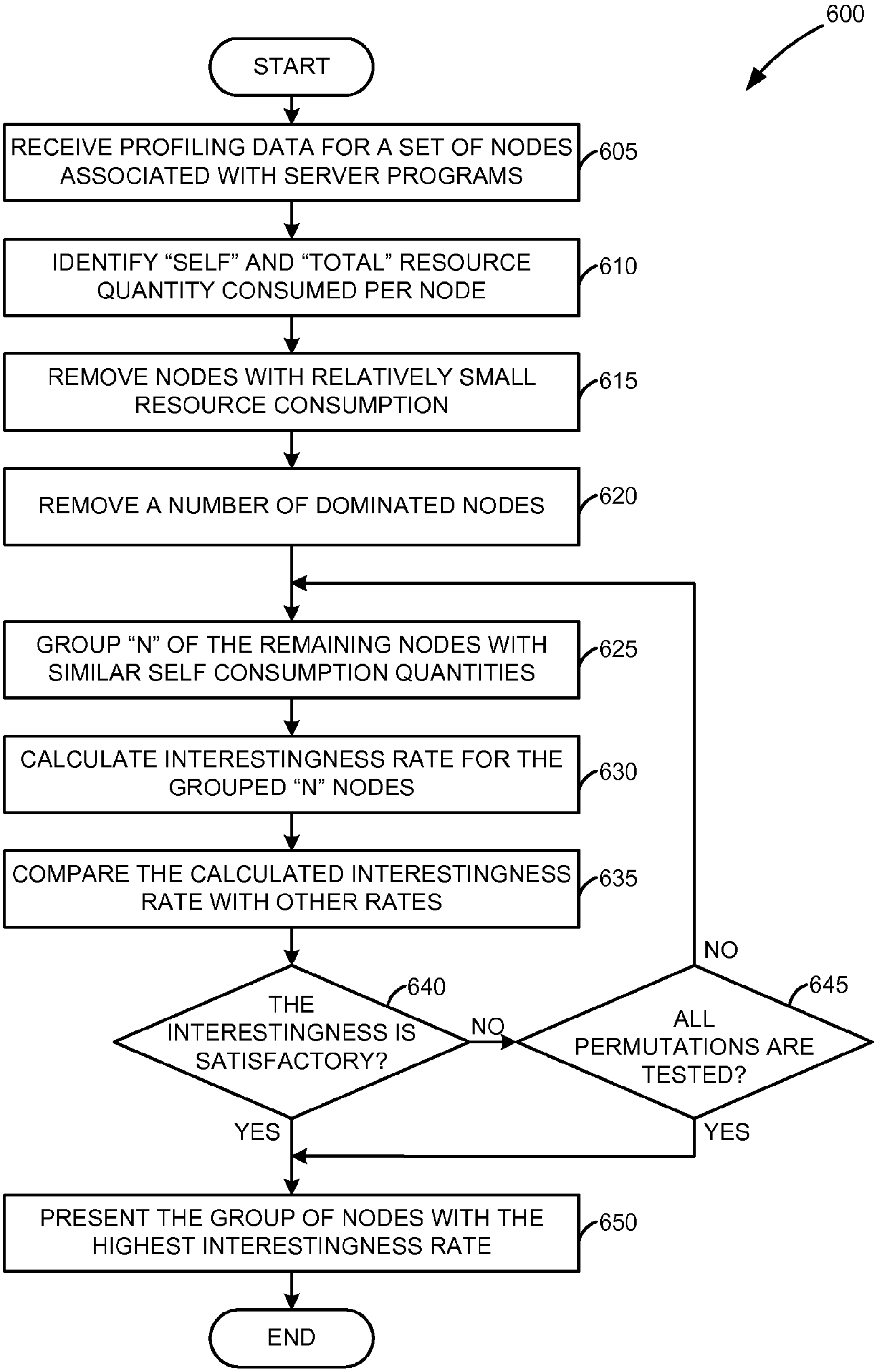
FIG. 6 illustrates a process for selecting a representative subset of hierarchically related nodes.

Some of the elements of the individual and group criteria for selecting a representative subset of nodes associated with the profiled computer programs could be conflicting, e.g., depending on resource consumption distribution. FIG. 6 shows process 600 for selecting a subset of "N" nodes from profiling data containing information for a set of hierarchically related nodes, according to one embodiment. The process 600 may be executed in a frontend of a profiling mechanism based on profiling data collected by a backend of the profiling mechanism. In other words, a client profiling application manipulates the data collected by a server profiling application, according to one embodiment. The client and server profiling applications may be integrated in a single profiling mechanism implemented in a computer system as illustrated in FIG. 1. In another embodiment, client profiling application and server profiling application may be autonomous. The communication between the client and server profiling applications may be online, e.g., by utilizing messaging tools, distributed transactions, etc.; or offline, e.g., by transferring profiling data stored in files.

At 605, a client profiling application receives profiling data for a set of nodes, e.g. runtime structure events, associated with one or more computer programs executed at a server system. The profiling data could be communicated online or offline, depending on the implementation of the profiling mechanism. Generally, the profiling data contains information about the nodes, including identification of the nodes, and quantities of consumed resources for each of the nodes. At 610, the profiling application identifies "self" and "total" resource quantity consumed per node. The "self" quantity is a score indicating resource consumption attributed to a single node, e.g., the memory allocated for each of a set of methods executed within the profiled programs. The "total" quantity indicates the combined resource consumption attributed to a node and to other nodes related to this node, e.g., the "total" memory allocated for a method and for all child methods directly or indirectly called by this method.

Nodes with relatively small resource consumption are removed from the set of received nodes at 615. For example, the nodes with "total" resource consumption score below a predefined threshold are not interesting for further analysis. These are the nodes consuming limited quantity of resources, and respectively, any improvement of the computer programs concerning these entities will bring only limited reduction of the overall resource consumption. In one embodiment, the threshold is defined as a function of the overall reported resource consumption and the cardinality "N" of the target subset of nodes:

$$t = \frac{Q}{N * f},$$

where "t" is the threshold score, "Q" is the overall reported quantity of consumed resources, and "f" is a coefficient. Typical value for "f" is 0.2 units or lower. Since the "total" value of a child node can never exceed the "total" value of its parent node, the children nodes of the nodes identified as small resource consumers can be removed as well. Usually, this step significantly reduces the number of profiled nodes to be further analyzed to identify the group of "N" most interesting methods.

At 620, a number of dominated nodes are removed from the received set of nodes associated with the profiled programs. For example, a node with small "self" resource consumption is usually dominated by a child node. In one embodiment, node "A" is considered dominated by its child node "B" if the "total" quantity of the resource consumed by node "B" is at least as large as a fraction "$\alpha_D$" of the "total" quantity of the resource consumed by node "A". An example value for "$\alpha_D$" could be 0.8 units or higher. The reason for this operation is to remove those nodes which simply forward the work tasks for execution to their child nodes.

After the completion of the actions of process 600 corresponding to blocks 615 and 620, the initially received profiling data is significantly reduced. However, the remaining data may still include too many nodes to be directly presented. Once again, the goal of process 600 is to extract a manageable subset of nodes together with their corresponding resource consumption scores from the received profiling data. The subset of nodes should correspond to the runtime program entities which account for the bulk of the resource consumption. Therefore, an optimization of the nodes in the target subset would result in significant reduction of the overall resource consumption of the profiled programs.

As discussed earlier, the nodes associated with the profiled computer programs are related to each other. Therefore, rating the interestingness of a single node, without taking into account the existing relations with other nodes, may produce misleading results. It would be inefficient to assign a single interestingness rate to a single node, e.g., to a single method, isolated from the other methods called by this method, or isolated from the other methods calling the method. In general, all parts of the profiled software programs have to be accounted for. For example, different program modules may execute different thread sequences of the monitored methods, or other runtime structure events. These different relations should also be considered in order to identify the elements of the profiled programs, which in combination account for the most part of the consumed resources.

At 625, "N" of the remaining nodes with similar "self" resource consumption quantities are grouped in a subset. The grouped nodes could be either randomly or systematically selected. In one embodiment, the requirement for similar "self" resource consumption may be modified to account for corrected scores, or the "N" nodes may be selected without any criteria. The "N" nodes may be selected to cover at least a predefined fraction of the overall resource consumption of the profiled programs.

At 630, interestingness rate is calculated for the subset of "N" grouped nodes. Different criteria or mathematical formulas could be used for calculating the interestingness rate of the group of nodes. In one embodiment, the interestingness rate of the subset of "N" nodes corresponds to the result of the following function:

$$V = N\ln N + \sum_{i=1}^{N} \ln\left(\frac{q_i}{\sum_{i=1}^{N} q_i^{nd}}\right) - \frac{\sum_{i=1}^{N} q_i - q_i^{nd}}{\sum_{i=1}^{N} q_i^{nd}}$$

In this formula, "V" is the interestingness rate value; "N" is the cardinality of the subset of the selected nodes; "$q_i$" is the "total" resource quantity allocated to the $i^{th}$ node (e.g., method); and "$q_i^{nd}$" is the corrected "$q_i$", reduced with the resource quantity consumed by any child nodes of the $i^{th}$ node that are included in the group of "N" nodes.

The illustrated formula includes three parts. The first part is a constant and ensures that the maximum value "V" of the interestingness rate is zero. The maximum value is calculated only if nodes with optimal distribution of consumed resource quantities are selected. The second part of the formula accounts for the differences between the quantities corresponding to resources consumed by the nodes in the group, e.g., for the resource consumption distribution within the group of nodes. The smaller the differences, the bigger the value, e.g., the groups of nodes with more even distribution of the consumed resource quantities will have higher interestingness rate. The last part of the formula reflects the overlapping between the grouped nodes, e.g., the number of related nodes within the subset.

Different embodiments may use different formulas for calculating interestingness rates. The selection of the mathematical expression to be applied may depend on the type or the purpose of the profiled programs. Further, the formula may reflect what kind of runtime structure entities are profiled, and what kind of data is collected, e.g., consumption of what kind of resources is logged (memory allocation, number of allocated objects, CPU usage, I/O operations, etc.). For example, a slightly different formula for calculating interestingness rate of a subset of "N" nodes could be applied:

$$V = 2 + \sum_{i=1}^{N} \ln\left(\frac{q_i}{\sum_{i=1}^{N} q_i^{nd}}\right) \cdot \frac{1}{\ln(N)} - \sum_{i=1}^{N} \frac{q_i^{nd}}{Q}$$

where "Q" is the overall consumed resource quantity of the originally received set of nodes associated with the profiled programs. This formula is also constructed by three parts. The first part is again for ensuring that the maximum possible interestingness rate value "V" is zero, and the second part is maximized when the consumed quantity scores of the selected "N" nodes are similar. The last part of the second formula, however, accounts for the extent to which the selected "N" nodes are responsible for the overall resource consumption of the profiled programs.

At 635, the interestingness rate calculated for the selected group of "N" nodes is compared with other rates. For example, the calculated rate may be compared with interestingness rates calculated for different groups of nodes based on profiling data collected on previous profiling runs. Alternatively, the interestingness rate value may be measured according to an existing or predefined grid or levels of interestingness.

At 640, it is verified whether the rate of interestingness calculated for the group of nodes is satisfactory based on the comparison. When the calculated group interestingness of the selected "N" nodes is not satisfactory, e.g., the selected nodes in their combination are not representative for the resource consumption to consider relevant program optimizations; another group of "N" nodes is selected at 625. However, before moving back to 625, a check is performed at 645 to verify if all permutations of the available nodes in the profiling data have been tested. More specifically, it is tested whether interestingness rate have been calculated for all possible subsets of "N" nodes.

If, at 640, it is confirmed that the interestingness rate calculated for a current group of "N" nodes is satisfactory, or if, at 645, it is confirmed that all permutations of subsets of "N" nodes has been tested, the group of "N" nodes selected from the current profiling data with the highest interestingness rate is presented at 650. The group of "N" nodes with the highest interestingness rate could be the currently tested group which satisfied the check at 640. The presentation of the subset of "N" nodes with highest or satisfactory interestingness rate may display the hierarchical relationships between the grouped nodes, and/or between the grouped nodes and the rest of the profiled entities.

Generally, finding an optimal set of nodes, e.g., methods, could be computationally expensive. In one embodiment, the process 600 would just try every possible permutation of nodes combinations, and choose the one which yields the highest interestingness rate. While not feasible for the general case, if enough nodes have been removed at steps 615 and 620, and the selected number "N" of nodes to be presented is not too large, this could be a viable strategy. Otherwise a sampling approach is appropriate, where random subsets of "N" nodes are selected to compute interestingness rate, until a satisfactory level is reached at 640.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
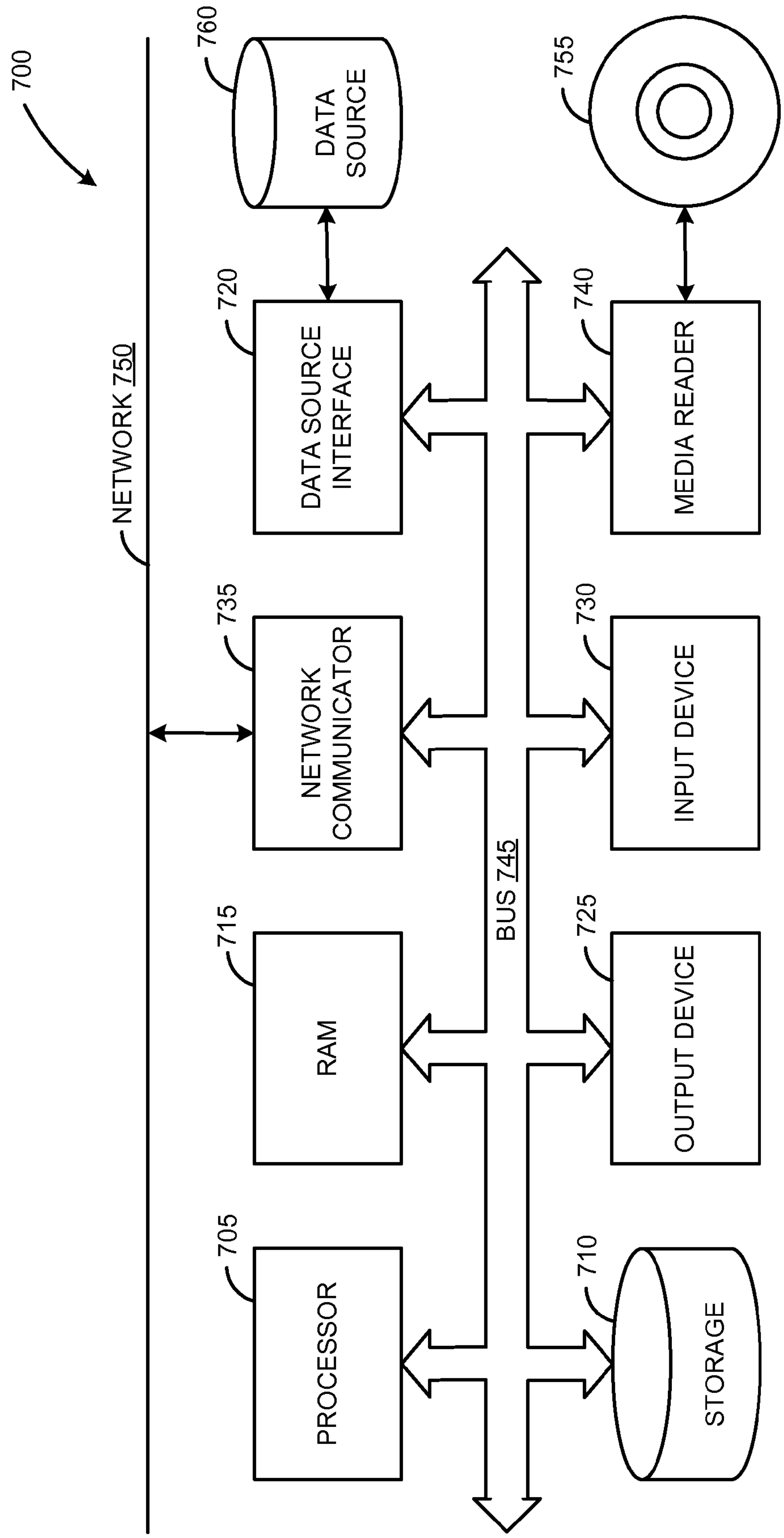
FIG. 7 is a block diagram of an exemplary computer system where profiling mechanism is implemented, according to one embodiment.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed via network 750. In some embodiments the data source 760 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer system for rating interestingness of profiling data subsets comprising:

a memory to store computer instructions; and a processor coupled to said memory to execute said computer instructions to:

receive a plurality of nodes associated with at least one executed computer program;

receive a first set of scores for said plurality of nodes, wherein a score of said first set of scores indicates a resource consumption of a corresponding node;

calculating a score of a second set of scores for said corresponding node by summing a plurality of scores from said first set of scores, wherein said plurality of scores corresponds to said corresponding node or to at least one node related to said corresponding node, wherein the score of said second set of scores indicates a combined resource consumption of said corresponding node, and wherein the combined resource consumption comprises the resource consumption of the corresponding node and resource consumption of the at least one node related to said corresponding node;

removing a node from said plurality of nodes when a proportion between a score of said second set of scores corresponding to said node and a score of said second set of scores corresponding to a related node is lower than a second predefined value;

calculate an interestingness rate for a group of nodes from said plurality of nodes based on one or more of said first set of scores and said second set of scores, wherein said interestingness rate is associated with a cardinality of said group of nodes, the combined resource consumption of a node from said group of nodes, and a corrected total resource consumption of said node from said group of nodes; and compare said calculated interestingness rate with at least one threshold rate to verify interestingness for said group of nodes.

2. The system of claim 1, wherein receiving the plurality of nodes comprises: retrieving at least one relationship between at least two nodes wherein said at least one relationship corresponds to execution flow of said at least one computer program.

3. The system of claim 1, wherein comparing the calculated interestingness rate comprises:

calculating a new interestingness rate for a new group of nodes of said plurality of nodes based on corresponding scores from one or more of said first set of scores and said second set of scores; and comparing the interestingness rate calculated for the initial group of nodes with the new interestingness rate calculated for said new group of nodes.

4. An article of manufacture including a non-transitory computer readable storage medium storing instructions, which when executed by a computer, cause the computer to:

receive profiling data for at least one executed computer program, wherein said profiling data includes a plurality of nodes associated with said at least one computer program and a first set of scores, wherein a score of said first set of scores indicates a resource consumption of a corresponding node;

calculate a score of a second set of scores for said corresponding node by summing a plurality of scores from said first set of scores, wherein said plurality of scores corresponds to said corresponding node or at least one node related to said corresponding node, wherein the score of said second set of scores indicates a combined resource consumption of said corresponding node, wherein the combined resource consumption comprises the resource consumption of the corresponding node and resource consumption of the at least one node related to said corresponding node;

remove a node from said plurality of nodes when a proportion between a score of said second set of scores corresponding to said node and a score of said second set of scores corresponding to a related node is lower than a second predefined value;

calculate an interestingness rate for a group of nodes from said plurality of nodes based on one or more of said first set of scores and said second set of scores, wherein said interestingness rate is associated with a cardinality of said group of nodes, the combined resource consumption of a node from said group of nodes, and a corrected total resource consumption of said node from said group of nodes; andreport said group of nodes when said interestingness rate is higher than a predefined value.

5. The article of manufacture of claim 4, wherein receiving the profiling data comprises:

retrieving at least one relationship between at least two nodes, wherein said at least one relationship corresponds to an execution thread of said at least one computer program.

6. The article of manufacture of claim 4, wherein calculating the interestingness rate for the group of nodes comprises: removing a node from said plurality of nodes when a score of said first set of scores or said second set of scores corresponding to said node is lower than a predefined fraction of overall resource consumption of said plurality of nodes.

7. The article of manufacture of claim 4, wherein calculating the interestingness rate for the group of nodes comprises: computing a mathematical expression combining a group of scores from said second set of scores corresponding to said group of nodes to evaluate resource consumption distribution within said group of nodes.

8. The article of manufacture of claim 4, wherein calculating the interestingness rate for the group of nodes comprises:

decreasing a score from said second set of scores corresponding to a first node of by a score of said second set of scores corresponding to a second node, wherein said first node and said second node are related; and based on the decreased score evaluating overlapping between the nodes within said group of nodes.

9. The article of manufacture of claim 4, wherein reporting said group of nodes comprises:

calculate a new interestingness rate for a new group of nodes from said plurality of nodes based on a score from one or more of said first set of scores and said second set of scores; and assigning said new interestingness rate to said predefined value.

10. A computerized method for rating interestingness of profiling data subsets, comprising:

receiving at a computer memory, a plurality of nodes associated with at least one computer program executed in a computer system;

receiving at said computer memory, a first set of scores, wherein a score of said first set of scores indicates a resource consumption of a corresponding node;

calculating at said computer memory a score of a second set of scores for said corresponding node by summing a plurality of scores from said first set of scores, wherein said plurality of scores corresponds to said corresponding node or at least one node related to said corresponding node, wherein the score of said second set of scores indicates a combined resource consumption of said corresponding node, wherein the combined resource consumption comprises the resource consumption of the corresponding node and resource consumption of the at least one node related to said corresponding node;

removing a node from said plurality of nodes when a proportion between a score of said second set of scores corresponding to said node and a score of said second set of scores corresponding to a related node is lower than a second predefined value;

calculating by a processor, an interestingness rate for a group of nodes from said plurality of nodes based on one or more of said first set of scores and said second set of scores, wherein said interestingness rate is associated with a cardinality of said group of nodes, the combined resource consumption of a node from said group of nodes, and a corrected total resource consumption of said node from said group of nodes; and rendering on a user interface said group of nodes based on said interestingness rate.

11. The method of claim 10, wherein receiving the plurality of nodes comprises: retrieving a hierarchical relationship between at least two nodes of said plurality of nodes, wherein an execution of said at least one computer program moves from a node of said at least two nodes at a higher hierarchical level to a node of said at least two nodes at a lower hierarchical level.

12. The method of claim 11, wherein at least one node of said plurality of nodes corresponds to a first method of said at least one computer program, and wherein said hierarchical relationship corresponds to a second method.

13. The method of claim 10, wherein calculating the interestingness rate for the group of nodes comprises: removing a node from said plurality of nodes when a score of said second set of scores corresponding to said node is lower than a value based on overall resource consumption of said plurality of nodes.

14. The method of claim 10, wherein calculating the interestingness rate for the group of nodes comprises: removing a node from said plurality of nodes when said node is dominated by a related node.

15. The method of claim 10, wherein calculating the interestingness rate for the group of nodes comprises: computing a plurality of scores from said second set of scores corresponding to said group of nodes to evaluate resource consumption distribution within said group of nodes.

16. The method of claim 10, wherein calculating the interestingness rate for the group of nodes comprises: decreasing a score from said second set of scores corresponding to a first node by a score of said second set of score corresponding to a second node to evaluate overlapping between the nodes of the group, wherein said first node and said second node are related.

17. The method of claim 10, wherein calculating the interestingness rate for the group of nodes comprises: decreasing a score from said second set of scores corresponding to a first node by a score of said second set of scores corresponding to a second node to evaluate said group of nodes for an overall resource consumption of said at least one computer program, wherein said first node and said second node are related.

* * * * *